United States Patent [19]

Peterson

[11] Patent Number: 4,538,224
[45] Date of Patent: Aug. 27, 1985

[54] DIRECT MEMORY ACCESS PERIPHERAL UNIT CONTROLLER

[75] Inventor: Thomas A. Peterson, Naperville, Ill.

[73] Assignee: AT&T Bell Laboratories, Murray Hill, N.J.

[21] Appl. No.: 428,681

[22] Filed: Sep. 30, 1982

[51] Int. Cl.³ .......................... G06F 9/24; G06F 3/00
[52] U.S. Cl. .................................................. 364/200
[58] Field of Search ........ 364/200, 900, 200 MS File, 364/900 MS File

[56] References Cited

U.S. PATENT DOCUMENTS

| | | | |
|---|---|---|---|
| 4,075,691 | 2/1978 | Davis et al. | 364/200 |
| 4,093,981 | 6/1978 | McAllister et al. | 364/200 |
| 4,137,565 | 1/1979 | Mager et al. | 364/200 |
| 4,298,959 | 11/1981 | Sundermeyer et al. | 364/900 |
| 4,344,130 | 8/1982 | Fung et al. | 364/200 |
| 4,371,932 | 2/1983 | Dinwiddle, Jr. et al. | 364/200 |

FOREIGN PATENT DOCUMENTS

| | | |
|---|---|---|
| 0021489 | 7/1981 | European Pat. Off. . |
| 0050434 | 4/1982 | European Pat. Off. . |
| 57-143629 | 2/1981 | Japan . |

*Primary Examiner*—Harvey E. Springborn
*Attorney, Agent, or Firm*—Richard J. Godlewski

[57] ABSTRACT

A peripheral unit controller loads a microprocessor program received from a host processor into a random access memory of a microprocessor-controlled peripheral unit. The program-controlled microprocessor included in the peripheral unit controls the transfer of data between the host processor and the memory and between the memory and a communication channel data link. The peripheral unit controller includes input and output buffer registers, a direct memory access controller, and a host access buffer. Connected between data and address buses of the peripheral unit, the host access buffer transfers controller addresses received from the host processor on the data bus to the address bus to load a program memory address and program word count into the registers of the direct memory access controller. In response to orders received from the host processor, the direct memory access controller uses the program memory address and word count to address locations in the random access memory in which the microprocessor program is loaded.

20 Claims, 10 Drawing Figures

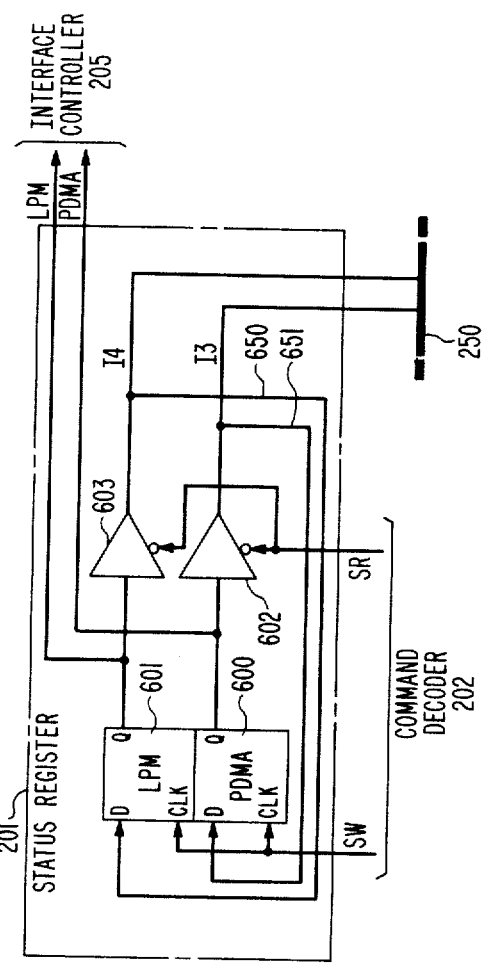

DIRECT MEMORY ACCESS PERIPHERAL UNIT CONTROLLER

TECHNICAL FIELD

This invention relates to direct memory access (DMA) signal processing and, more particularly, to a peripheral unit controller for transferring data between a host processor and an associated peripheral unit.

BACKGROUND OF THE INVENTION

Direct memory access (DMA) signal processing is well-known in information transfer systems for storing in a random access memory directly accessible by a processor, information including data received from one or more sources of signal transmissions. The purpose of the DMA circuitry is to provide ready memory access by the processor to the received data with a minimum of processor time. The DMA circuitry receives the data from one or more sources and stores the data at addressable locations in the memory which are designated by the processor.

In a typical information transfer system, such as a data communication channel where a data link is used to transfer data between a host processor and a remote data center location, a microprocessor-controlled direct memory access interface unit temporarily stores blocks of data received from both the host processor and the data link in a random access memory for subsequent transmission to the other unit after a complete block of data has been received. This is normally done to interface two units that transmit data at different bit rates, have different levels of data protocol, etc. Typically, the interface unit includes a peripheral unit having a program-controlled microprocessor and an associated program memory to transfer data and a peripheral unit controller to control the transfer of data between the host processor and data link.

However, in the prior art, neither the host processor nor the data link can access the peripheral program memory to modify, alter, or load the microprocessor program. A portion of the program may be stored in the random access memory, but at least one portion of the program which contains a recovery or bootstrap routine must be stored in a permanent type memory such as a read only memory.

In addition to the cost of two types of memories, the permanent memory causes another problem. Every time the microprocessor program is changed, for whatever reason, the permanent memory needs to be replaced or physically modified. When a large number of interface units are utilized such as, for example, with telecommunication switching systems transmitting billing information to a remote billing data center, the cost of maintenance personnel to replace or modify the permanent program memory in a large number of switching systems across the country is enormous. Hence, a direct memory access interface unit that is directly accessible by a host processor to load a microprocessor program in a random access memory is highly desirable.

SUMMARY OF THE INVENTION

The foregoing problems are solved and a technical advance is achieved in a direct memory access peripheral unit controller which provides host processor access to the program memory portion of a peripheral unit. The peripheral unit memory comprises a data portion and a program portion. The peripheral unit controller is responsive to control signals from the peripheral processor to generate memory addresses for the data portion and is responsive to control signals from the host processor to generate memory addresses for the program portion of the memory.

Advantageously, in accordance with this invention, a host processor may provide programs for a peripheral processor thereby eliminating the need for a permanent read-only memory to store a bootstrap program for the peripheral processor.

In one embodiment of the invention, the peripheral unit controller includes buffer registers for storing data to be transferred between the host processor and the memory and a direct memory access controller which is connected to a data bus interconnecting the buffer registers, the peripheral processor, and the memory and is also connected to an address bus interconnecting the peripheral processor and the memory. The peripheral unit controller comprises a host access buffer responsive to control signals from the host processor to transfer information from the data bus to the address bus and the controller is responsive to addresses on the address bus to store informaton appearing on the data bus. In accordance with this invention, an initial memory address and program word count may be supplied to the peripheral unit controller and a peripheral processor program consisting of a plurality of program words which may be transferred to the program portion of the peripheral unit memory.

In accordance with one feature of this invention, the peripheral unit controller includes status register means responsive to control signals from the host processor to selectively control the controller and the host access buffer and to selectively inhibit operation of the peripheral processor.

BRIEF DESCRIPTION OF THE DRAWING

The invention may be better understood from the following detailed description when read with reference to the drawing in which:

FIG. 5 shows an exemplary truth table for the command decoder;

FIG. 6 shows a detailed block diagram of the status register for controlling the mode of the interface unit;

FIG. 7 shows a truth table illustrating the relationship between the state of the status register flip-flops and the mode of the interface unit;

DETAILED DESCRIPTION

Figure 1:
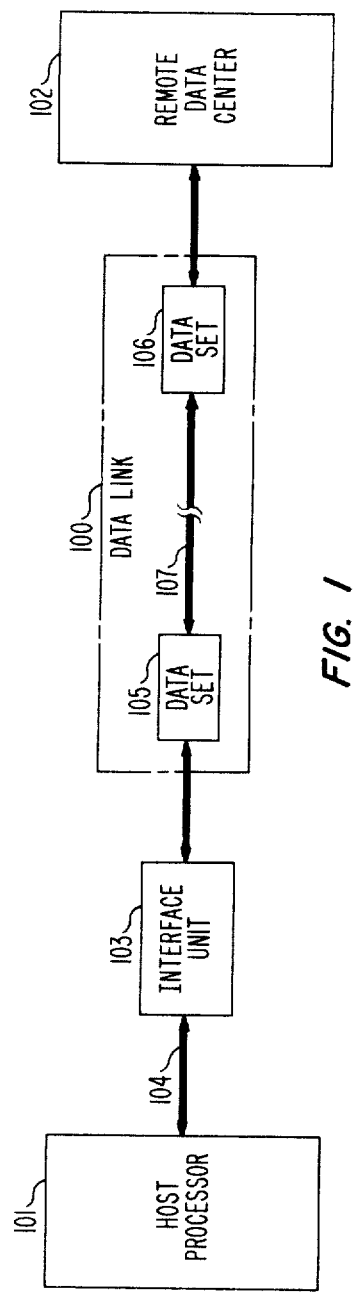
FIG. 1 shows a block diagram of an interface unit of the invention for transferring data between the I/O channel of a host processor and a data link connected to a remote data center.

Illustrated in the block diagram of FIG. 1 is an interface unit 103 employing a direct memory access peripheral unit controller of the present invention for transferring a peripheral unit program received from the I/O channel 104 of host processor 101 into a peripheral unit random access memory of the interface unit. Interface unit 103 also transfers data between host processor 101 and data set 105 of communication channel data link 100 that is connected to remote data center 102. Data link 100 includes data sets 105 and 106 at the respective ends of typical transmission facility 107 for transmitting and receiving data between the host processor and data center.

Host processor 101, as depicted in FIG. 1, is a typical processor such as, for example, the 3A Processor utilized in the No. 2B ESS which is manufactured by the Western Electric Company, Incorporated. This processor is described in detail in the *Bell System Technical Journal*, Vol. 55, No. 2, February, 1976.

Remote data center 102 may be any typical data processing system such as, for example, a message billing center for collecting telephone message billing information from host processor 101.

Figure 2:
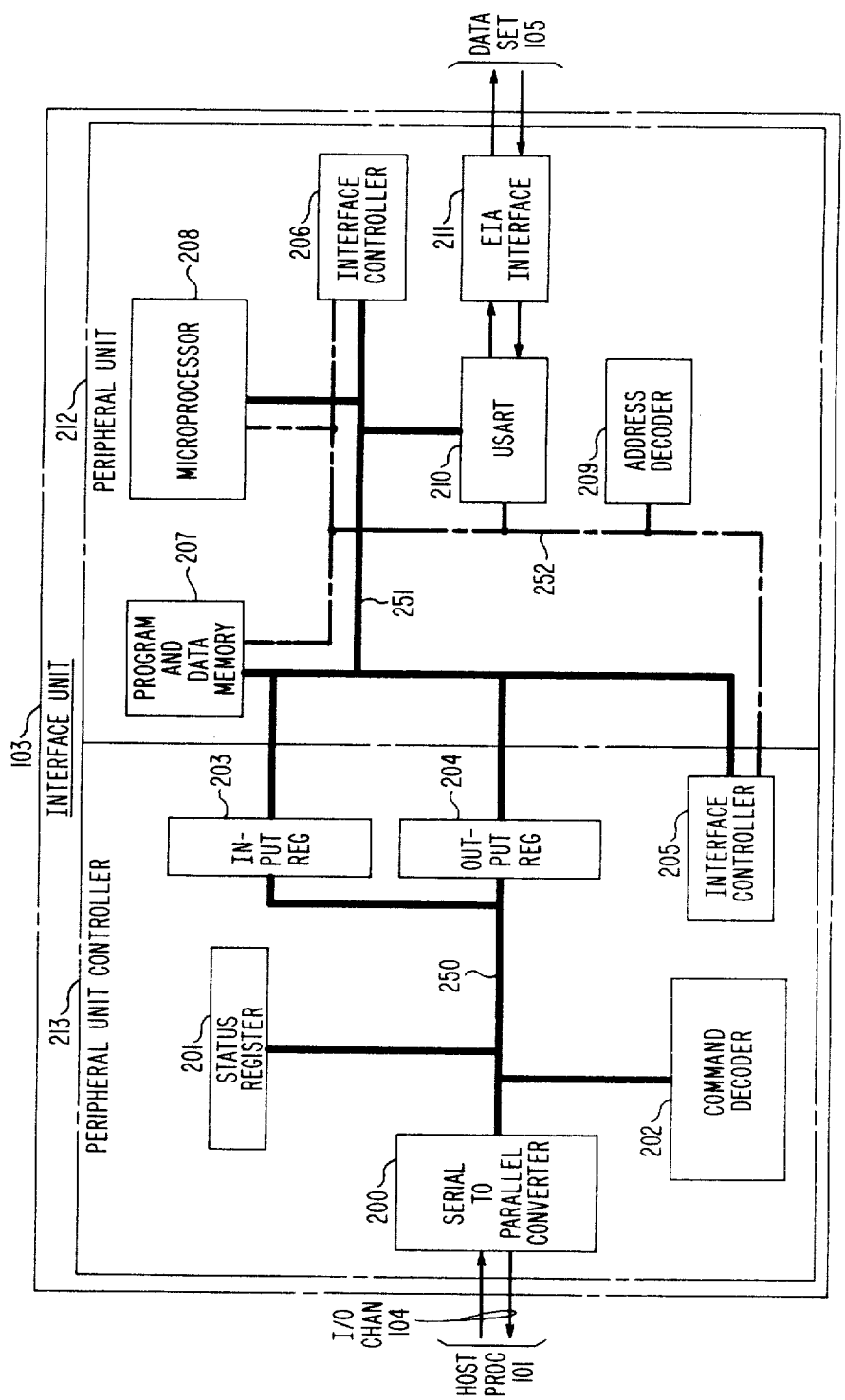
FIG. 2 shows a block diagram of the interface unit of FIG. 1.

Interface unit 103 comprises a peripheral unit and a peripheral unit controller for transferring data between I/O channel 104 and data set 105. Depicted in FIG. 2 is a block diagram of microprocessor-controlled interface unit 103 which comprises peripheral unit 212 and peripheral unit controller 213. The peripheral unit controller includes serial-to-parallel converter 200 for serial I/O channel 104 communications, status register 201 for controlling the mode of the interface unit, command decoder 202 for decoding orders from the host processor, input and output buffer registers 203 and 204 for temporarily storing data being transferred between information bus 250 and data bus 251, and interface controller 205. The peripheral unit includes interface controller 206, program and data memory 207, microprocessor 208, address decoder 209, and Universal Synchronous Asynchronous Receiver Transmitter (USART) 210, all of which are interconnected by data bus 251 and address bus 252 as indicated. In addition, various leads, which have not been shown to simplify the drawing, interconnect the units of the interface unit to conduct miscellaneous control signals therebetween as will be described hereinafter. Connected to the USART is interface circuit 211 for converting the logic voltage levels of the USART to standard voltage levels such as, for example, prescribed by Electronics Industry Association (EIA) standards RS 232 and RS 449. This voltage level conversion permits the user to connect interface unit 103 to any well-known and commercially available modem such as, data sets 105 and 106. Interface unit 103 further comprises miscellaneous equipment units such as, for example, parity and timing circuits that have not been shown to simplify the drawing.

Figure 3:
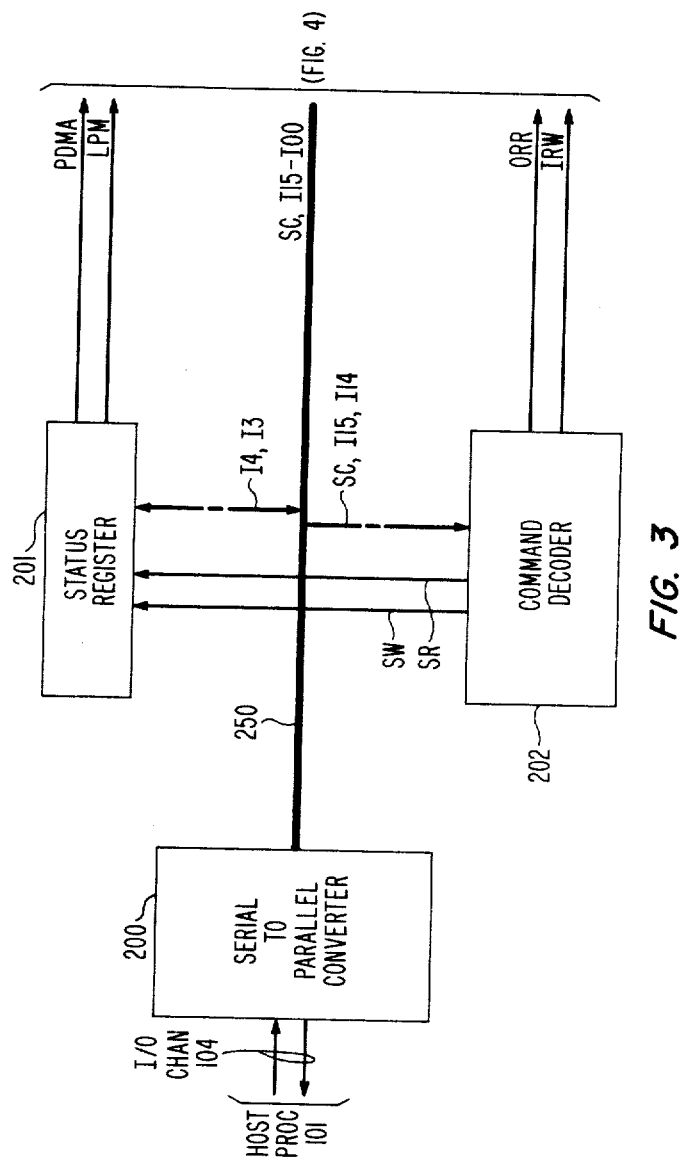
FIG. 3 shows a detailed block diagram of one portion of the interface unit including a serial-to-parallel converter, a status register, and a command decoder along with the interconnections therebetween.
Figure 4:
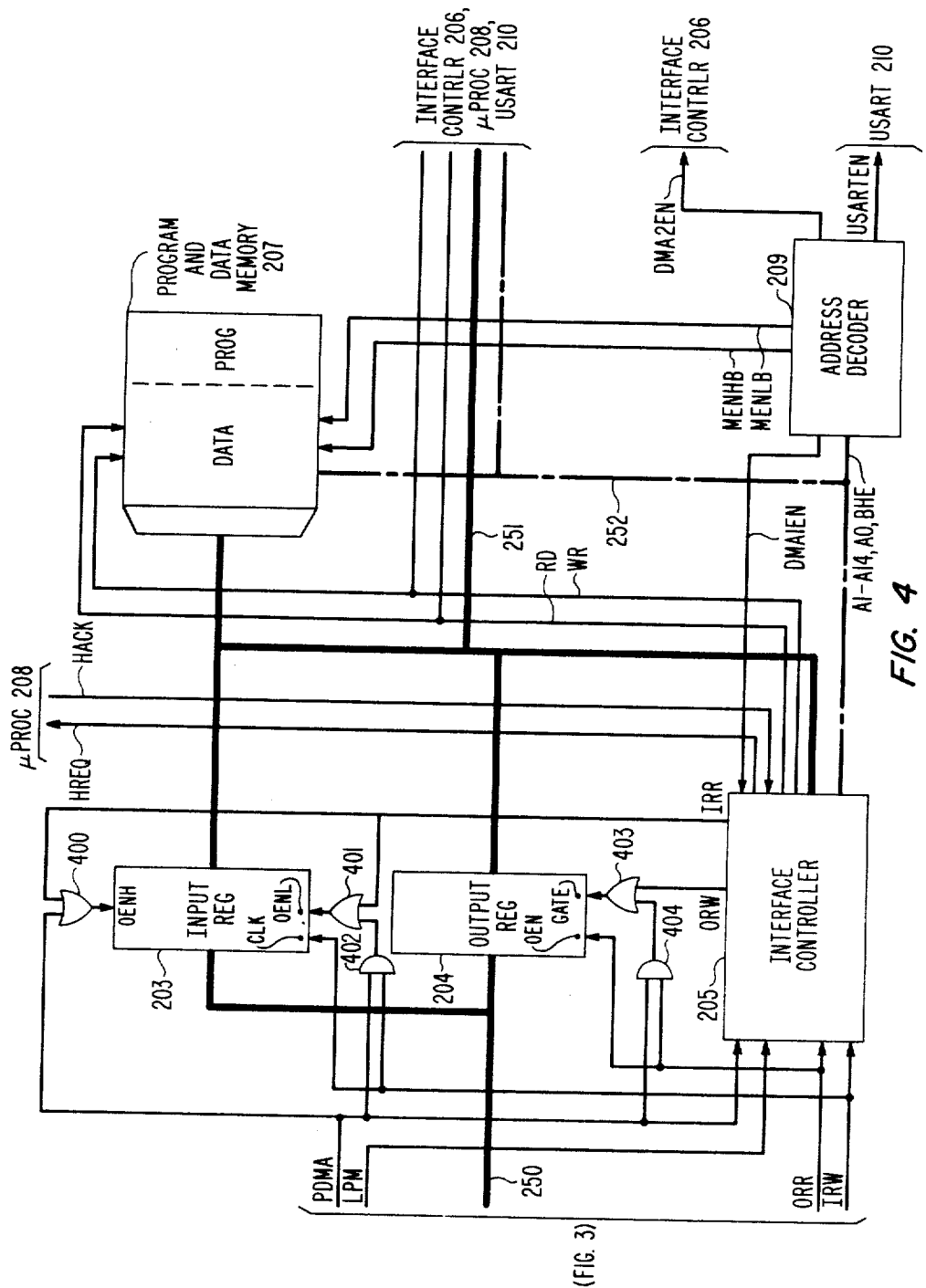
FIG. 4 shows a detailed block diagram of another portion of the interface unit for transferring data between an information bus and a data memory under the control of an interface controller.

Depicted in FIGS. 3 and 4 are more detailed block diagrams of two portions of the interface unit. Included in FIG. 3 is serial-to-parallel converter 200, status register 201, and command decoder 202 interconnected by information bus 250. As indicated, miscellaneous leads are also provided for various control functions. FIG. 4 shows 16-bit, D-type flip-flop input and output buffer registers 203 and 204; interface controller 205; program and data memory 207; and address decoder 209 along with the interconnections therebetween.

Serial-to-parallel converter 200 is a well-known serial-in, parallel-out and parallel-in, serial-out device for converting serial data from the host processor on I/O channel 104 to a parallel format on information bus 250. Similarly, data in a parallel format on information bus 250 is converted to a serial format for transmission to the host processor. The converter comprises well-known cable receivers and drivers as well as a shift register with related timing circuitry to perform the aforementioned functions. The timing circuitry generates clock signals from the transitions of the incoming signal to control the transfer of information and the sequencing of the units in the interface unit such as the command decoder.

Information from host processor 101 may include orders to read and write input and output buffer registers 203 and 204 as well as status register 201. These orders are interpreted by command decoder 202 which is connected to information bus 250. For example, the host processor has two orders, normal and maintenance, that result in a serial bitstream being sent to the interface unit. This serial bitstream includes a 21-bit word followed by a string of zeros that continues until the host processor detects a response. The 21-bit word contains a three-bit start code (SC2-SC0), 16 bits of data (I15-I00), and two bits of parity. The start code represents one of two values, one for each of the two types of host processor orders. For every host processor order, program-controlled interface unit 103 responds by sending 21 bits of information followed by a string of zeros which continues until the host processor stops sending zeros.

Packets or blocks of data words are transferred to and from the interface unit through the use of data write and data read orders. The data write order, which uses the normal start code, is used to write a packet descriptor or 16 bits of data into input buffer register 203. The packet descriptor indicates to microprocessor 208 the size of the data packet or the number of 16-bit data words in the packet. The data read order, which uses the maintenance order along with selected bits of the data, is used to read a packet descriptor or data from output buffer register 204. Command decoder 202 interprets selected bits of the start code (SC2) and data (I15, I14) and, in case of a write operation, activates the IRW or SW lead to cause data (I15-I00) on the information bus to be written into input buffer 203 or status register 201, respectively. Similarly, the decoder activates the ORR or SR lead to cause data to be read out of output buffer 204 and status registers 201, respectively, onto information bus 250.

Depicted in FIG. 5 is an exemplary truth table for command decoder 202. The table illustrates what combination of selected start code and data bits are necessary for the command decoder to activate one of the IRW, SW, SR, and ORR leads. For example, when start code bit SC2 represents a logic zero, the decoder activates the IRW lead regardless of the value represented by data bits I15 and I14. When the SC2 bit represents a logic one, the decoder activates one of the SW, SR, or ORR leads depending on the value represented by data bits I15 and I14. In addition, command decoder 202 in response to start code bit SC0 generates sequence timing signals to converter 200; registers 201, 203, and 204;

and controller 205 to transfer data between the serial-to-parallel converter and the status, input buffer, or output buffer register. One skilled in the art may readily design the command decoder to generate these timing signals, which have not been shown to simplify the drawing, and need not be fully described herein.

Status register 201 controls the mode or state of interface unit 103 as well as various operations performed in the unit. For example, selected bits (I4-I3) from the information bus are read into the status register when the SW lead is active to activate either one or both of the PDMA or LPM output leads. Similarly, the contents of the status register may be read out and sent to the host processor when the SR lead is active. A detailed block diagram of the PDMA and LPM bits of status register 201 are shown in FIG. 6. As mentioned, the status register may include other bits to indicate, for example, that a packet of data is ready for transmission to the host processor or that an error condition exists. The two-bit status register comprises D-type flip-flops 600 and 601 and tri-state drivers 602 and 603 which are well-known and commercially available devices. The I3 and I4 bits of the information bus connect to the D input terminals of flip-flops 600 and 601 via conductors 650 and 651, respectively; whereas the CLK input terminal of each flip-flop connects to the SW lead from decoder 202. When the SW lead is active, the data on the I3 and I4 bits of the information bus is read into the PDMA and LPM flip-flops, respectively. The contents appear on the Q output terminals of each flip-flop as a high and low logic level signal to activate either one or both of the PDMA and LPM leads. Furthermore, the Q output terminals of the PDMA and LPM flip-flops are also connected to the input terminals of tri-state drivers 602 and 603, respectively. When the SR lead is active, drivers 602 and 603 are enabled to conduct the contents of the PDMA and LPM flip-flops on to the I3 and I4 bits of the information bus. When disabled, drivers 602 and 603 assume a high impedance state thereby permitting data on the I3 and I4 leads to be written into the PDMA and LPM flip-flops.

As mentioned, the contents of the status register controls the state of interface unit 103. For example, when the contents of each of the PDMA and the LPM flip-flops represents a logic level one, the interface unit is in the PREPARE TO DOWNLOAD mode. When each of the PDMA and LPM flip-flops represents a logic level zero, the interface unit is in the NORMAL mode; and when the PDMA represents a logic level zero and the LPM flip-flop represents a logic level one, the unit is in the DOWNLOAD mode. This relationship between the contents of the PDMA and LPM flip-flops and the mode of the interface unit is depicted in the truth table in FIG. 7.

Returning to FIG. 4, data on information bus 250 is written into the input buffer register when the IRW lead is active in response to an input register write order from the host processor. An active IRW lead applies a signal to the CLK input terminal of the input buffer register to gate the data on the information bus into the input buffer register. When the interface unit is in the NORMAL and DOWNLOAD modes, an active IRW lead also causes controller 205 to subsequently activate the IRR lead which causes the contents of the input register to be read out onto data bus 251. Under control of controller 205, the data is then written into data memory 207.

For example, when the IRR lead from interface controller 205 is active, a signal is applied to OENH and OENL terminals of the input buffer register via logic OR gates 400 and 401, respectively, to gate the entire contents of the buffer register on to data bus 251. When the interface unit is in the PREPARE TO DOWNLOAD mode, the PDMA lead is active to read a portion of the data in the input register, the high byte of data, onto data bus 251. With only an active PDMA lead, a signal is applied to OENH terminal via logic OR gate 400 to gate the high byte of data in the input buffer register on to the data bus. When the interface unit receives an input register write order from the host processor the IRW is activated. This first causes the data on the information bus to be written into the input register. Then, the entire contents of the input register are read out onto the data bus. The data on the data bus from the input register is subsequently written into addressable registers of interface controller 205. When both the PDMA and IRW leads are active, a signal is applied to the OENL terminal via logic AND and OR gates 402 and 401, as indicated.

Data is similarly transferred from data bus 251 to information bus 250 by output buffer register 204. To read the contents from the output buffer register onto information bus 250, an active ORR lead simply applies a signal to the OEN terminal of the output buffer register in response to an output register read order from the host processor. Data on the data bus is written into the output buffer register in response to any one of several combinations of active input leads. For instance, when the interface unit is in the NORMAL and DOWNLOAD modes, interface controller 205 activates the ORW lead to apply a signal to GATE terminal of the output buffer register via logic OR gate 403 in response to an active ORR lead. Another combination to write the output register is when both the ORR and PDMA leads are active. This occurs when the interface unit is in the PREPARE TO DOWNLOAD mode, and the unit receives an output register read order from the host processor. Thus, a signal to write the output register is applied to the GATE terminal via logic AND gate 404 and logic OR gate 403.

Figure 8:
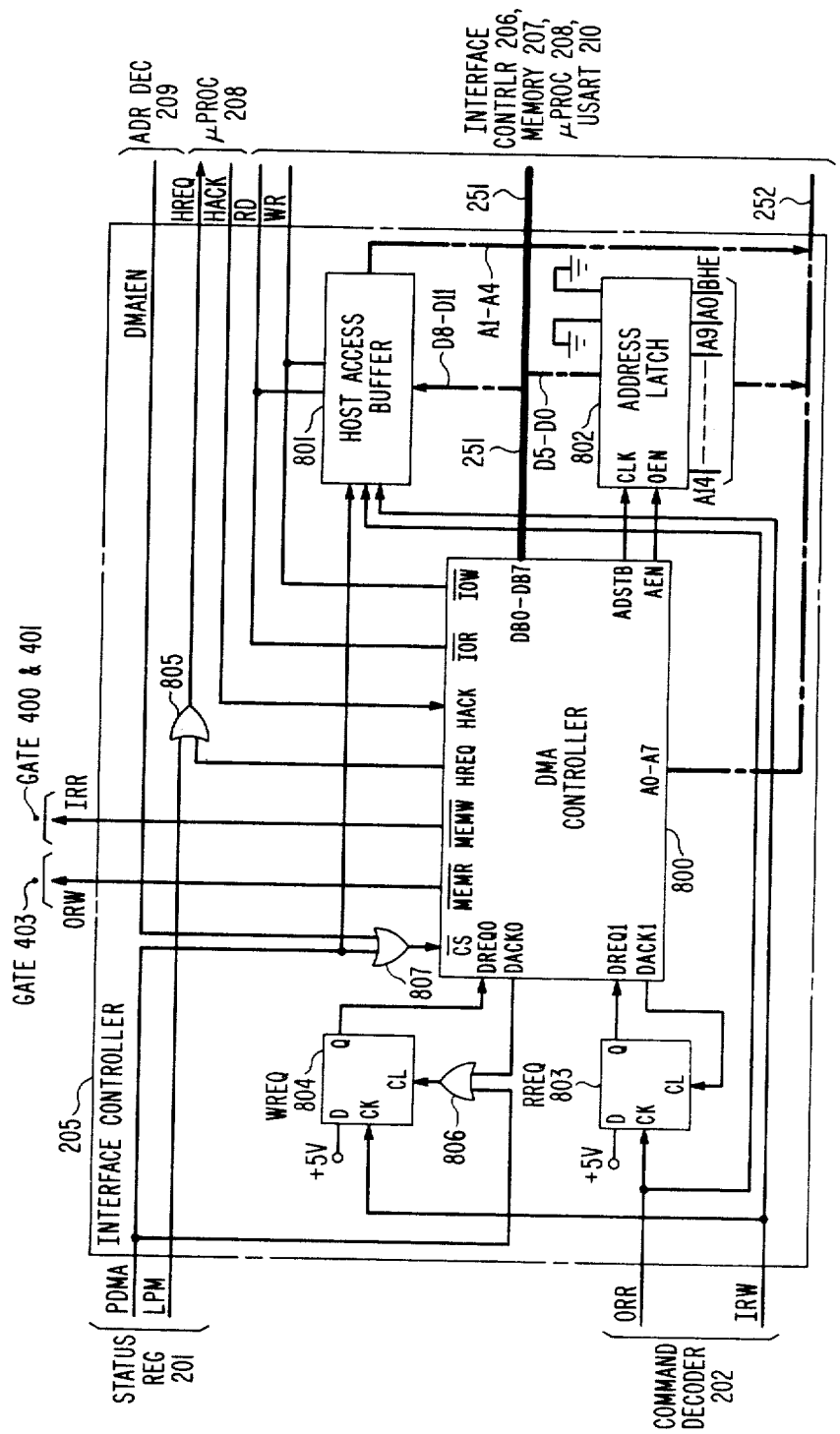
FIG. 8 shows a detailed block diagram of the interface controller for controlling the flow of data into and out of the data memory.

Using an address register and a word count register to address specific blocks of locations in memory 207, interface controller 205 controls the transfer of data between the memory and input and output buffer registers 203 and 204 in response to orders from the host processor. In addition, microprocessor 208 may address these registers in the interface controller via the address bus to load an initial memory address and a word count via the data bus, which represents the location and size of a block of memory and are used to transfer data in and out of memory 207. Specific registers in interface controller 205 may also be addressed by the host processor to load an initial memory address and word count. This initial memory address and memory word count is then used by the interface controller to download a program from the host processor to data memory 207. Depicted in FIG. 8 is interface controller 205 which comprises Direct Memory Access (DMA) controller 800, host access buffer 801, address latch 802, and read and write request flip-flops 803 and 804.

DMA controller 800 is any well-known and commercially available DMA controller such as, for example, Advanced Micro Devices Am9517 multimode DMA controller. The DMA controller may assume any one of three states: the active, program, and idle states. In the idle state, the DMA controller responds to an input register write and an output register read request from the host processor via active IRW and ORR leads. An active IRW lead causes WREQ flip-flop 804 to be set, flip-flop 804 being a well-known D-type flip-flop. A high logic level voltage (e.g., 5 volts) is applied to the D terminal of the flip-flop, and an active IRW lead applies a signal to the CK input terminal of the flip-flop to cause a logic level one to be loaded into the flip-flop. When set, the WREQ flip-flop causes the Q output terminal to assume a high logic level, thereby activating the DREQ0 terminal of the DMA controller. In response, the DMA controller sends a request to microprocessor 208 to allow the controller to use data and address buses 251 and 252. This is accomplished by the DMA controller activating the HREQ lead via logic OR gate 805 and the HREQ terminal of the controller. In turn, the microprocessor acknowledges the request by activating the HACK lead to the DMA controller.

Assuming the active state, the DMA controller clears the WREQ flip-flop by activating the CL terminal of the flip-flop via logic OR gate 806 and the DACK0 output terminal. Additionally, the DMA controller activates the IRR lead to read the contents of the input buffer register into a location in data memory 207 designated by an address generated on address bus 252.

The address signal is generated on the address bus by the DMA controller in a two step operation. First, the DMA controller loads one portion of the memory address into address latch 802 via data bus 251. Address latch 802 is an 8-bit D-type flip-flop register which is enabled to receive one portion of the address by activating the CLK terminal via the ADSTB terminal of the DMA controller. Next, the DMA controller generates the entire memory address signal on address bus 252 by activating the AEN output terminal to gate one portion of the memory address (A14-A9, A0, BHE) stored in the address latch on to address bus bits A14-A9, A0, and BHE and the remaining portion of the memory address signal (A1-A8) from output terminals A0-A7 on to address bus bits A1-A8. In addition, when the memory address signal is on the address bus, the DMA controller activates the WR lead which extends to the memory to enable the memory to receive the data in input buffer register 203 into the memory location designated by the address signal.

In a similar manner, the DMA controller transfers data from the memory to the output buffer register in response to an output register read from the host processor. This is accomplished by activating the ORR lead which sets the RREQ flip-flop 803 in a manner similar to the operation for setting WREQ flip-flop 804. When set, the RREQ flip-flop activates the Q output terminal and the DREQ1 input terminal to request the DMA controller to write the output buffer register with data from a location in data memory 207 designated by an address signal on address bus 252. In a manner similar to the input register read, the DMA controller requests the microprocessor to allow the controller to use the data and address buses. In response to an acknowledgement from the microprocessor, the DMA controller clears the RREQ flip-flop via output terminal DACK1 and generates the memory address signal on address bus 252 in a manner previously described. However, instead of activating the WR lead, the DMA controller activates the RD lead to enable the memory to transfer data from the designated location to the output buffer register. Likewise, the DMA controller activates the ORW lead instead of the IRR lead to write the output register with the data from the data memory. The DMA controller assumes the program mode in response to either an active PDMA lead set by the host processor or a specific controller address generated by the microprocessor and an active DMA1EN lead from address decoder 209. The DMA1EN lead is activated by address decoder 209 in response to an address bus signal having a field designated interface controller 205. In like manner, the address decoder enables memory 207 via active MENHB and MENLB leads, interface controller 206 via an active DMA2EN lead, USART 210 via an active USARTEN lead in response to an address signal field designating that unit. When the DMA controller receives a controller address signal from the microprocessor, the microprocessor loads an initial memory address and a word count into the DMA controller. The microprocessor accomplishes this by activating the WR lead and addressing the DMA controller via address bus 252. The initial memory address and word count loaded into the DMA controller are sent via data bus 251. When the DMA controller resumes the active state, the DMA controller uses the initial memory address and word count to address a particular segment of the data memory. In a similar manner, the microprocessor can read the contents of a DMA controller register by designating the address on the address bus and activating the RD lead. In response, the contents of the controller register is read out onto data bus 251.

The DMA controller may assume the program mode in response to an active PDMA lead set by the host processor. This is accomplished by the host processor causing the interface unit to assume the PREPARE TO DOWNLOAD mode. This occurs when the status register is written to activate the PDMA and the LPM leads. In response to an active LPM lead, interface controller 205 inhibits the microprocessor from using the address and data buses by activating the HREQ lead via OR gate 805. With the microprocessor inhibited, the host processor may directly program the DMA controller by addressing the controller via the host processor access buffer 801 and address bus 252. With the interface unit in the PREPARE TO DOWNLOAD mode, the host processor has control of and access to data bus 251. With an active PDMA lead, the host processor has access to the data bus via input buffer register in response to input register write orders from the host processor. In addition, an active PDMA lead enables host access buffer 801 to transfer selected bits of data D8-D11 on the data bus to address bus 252. Furthermore, an active PDMA lead causes the DMA controller to assume the program mode via logic OR gate 807 and also causes any input write requests to be inhibited by applying a signal to the CL lead of the WREQ flip-flop via logic OR gate 806.

Figure 9:
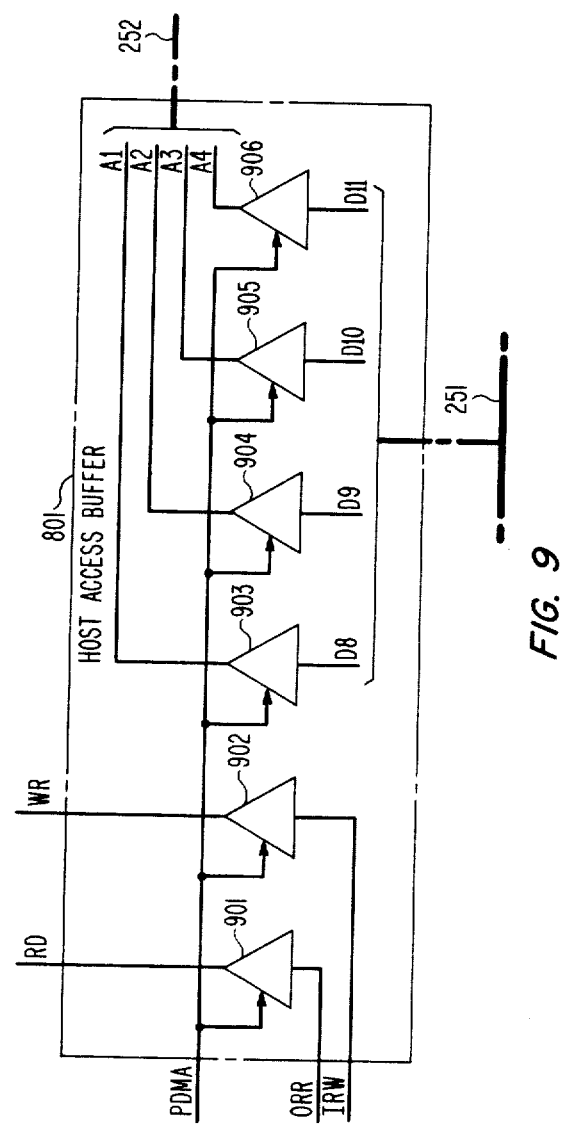
FIG. 9 shows a detailed diagram of the host access buffer for transferring interface controller address signals from the data bus to the address bus.

Host access buffer 801 comprises six well-known tri-state drivers and is depicted in FIG. 9. The data on data bus bits D8-D11 is transferred to address bus bits A1-A4 through tri-state drivers 903-906, respectively, with an active PDMA lead enabling the drivers. These four bits are used to address a specific DMA controller register in which the data on data bus leads D0-D7 is loaded. The host processor controls this operation by activating the IRW lead to the host access buffer which in turn activates the WR lead via driver 902. An active WR lead thus enables the write operation of the DMA controller. Likewise in a similar manner, the contents of a specific DMA controller register may be read out onto the data bus in response to the host processor activating the ORR and RD leads via driver 901. Thus, the host processor can read and write any specified register in the DMA controller. In addition, the host processor can now load an initial memory address and word count to cause the DMA controller to download a program into the memory when the DMA controller resumes the active state.

Memory 207 is a random access memory for storing blocks of data being transferred between the host processor and data set 105 and a program utilized by the microprocessor 208 to control the transfer of data through the interface unit. The memory unit receives data on data bus 251 and stores it in a location designated by a memory address signal on address bus 252. The two interface controllers and microprocessor enable the memory to either read out the contents of a memory location or write data into a location by activating the RD and WR, respectively. In addition, address decoder 209 activates the MENHB or MENLB leads to read or write either one or both bytes of a data word into or out of the memory.

Interface unit processor 208 may be any well-known microprocessor such as, for example, Intel's model 8086 for controlling the transfer of data in and out of the interface unit. The microprocessor is connected to address bus 251 and data bus 252 to send instructions to the other units of the controller. In addition, to addressing the units via the address bits, the microprocessor enables the units via activating the RD and WR leads.

Interface controller 206 comprises a DMA controller and an address latch similar to that of interface controller 205 for controlling the transfer of information between USART 210 and data memory 207. Unlike interface controller 205, interface controller 206 does not receive orders from the host processor but interacts with interface controller 205 and processor 208 to gain access to the address and data buses. Furthermore, interface controller 206 does not include a host access buffer and request flip-flops as does interface controller 205. Besides this, interface controller 206 functions much in the same way as interface controller 205 to transfer data beween USART 210 and memory 207 and need not by fully described herein.

To summarize, interface unit 103 has three operational modes: the NORMAL, DOWNLOAD, and PREPARE TO DOWNLOAD modes. The mode of the interface unit is controlled by the state of the PDMA and LPM status register bits which are writable by the host processor. When the interface unit is in the NORMAL mode, packets of data being transferred between the host processor and data set 105 are temporarily stored in an input and an output buffer of memory 207. Data from the host processor is written into the input buffer under the control of interface controller 205, and read out of the buffer to data set 105 under the control of interface controller 206. Similarly, data from data set 105 is written into the output buffer from data set 105 under the control of interface controller 206 and read out of the buffer to the host processor under control of interface controller 205. Thus, the host processor which operates at one rate of speed can quickly load the input buffer with a packet of data and then allow the data set which operates at a much lower rate of speed to then read the data out of the input buffer. A similar operation is performed with the output buffer when data is transferred from the data set to the host processor.

Figure 10:
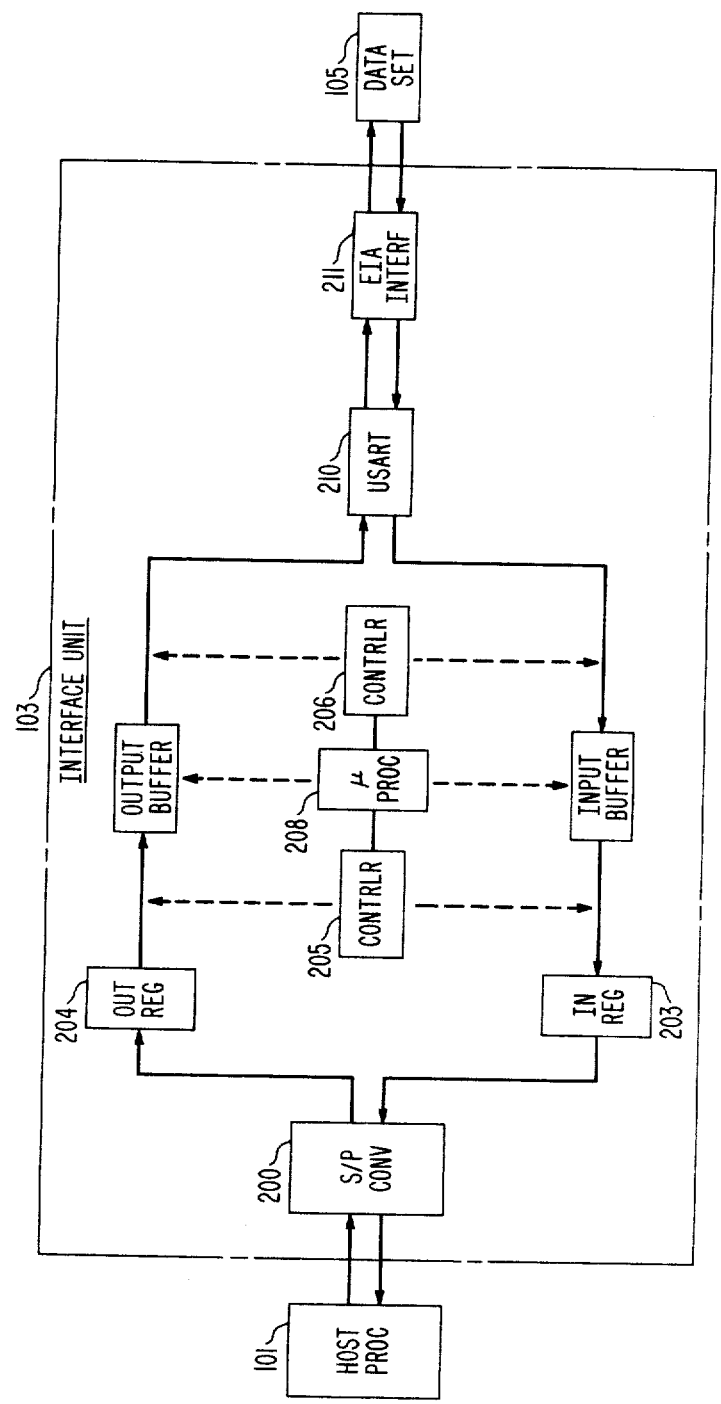
FIG. 10 shows a diagram which illustrates the flow of data between the host processor and the near-end data set of the data link.

Depicted in FIG. 10 is the flow of data between host processor 101 and data set 105 through interface unit 103 in the NORMAL mode. To transfer data from the host processor to the data set, the host transmits a serial word comprising an order and data to the interface unit to write the data into input register 203. Serial-to-parallel converter 200 converts the serial word to a parallel format on information bus 250. The order portion of the word is decoded by the command decoder to cause interface controller 205 to write input buffer register 203 with the data portion of the word. A request to program-controlled microprocessor 208 is made by interface controller 205 to transfer the data in input register 203 into a location in memory 207, referred to as the input buffer. When the microprocessor acknowledges this request, interface controller 205 has access to the address and data buses. The initial word of a block of data usually contains a packet descriptor which is interpreted by the microprocessor to know when a complete block of data from the host processor has been received for transmission. With the interface unit in the NORMAL mode, the initial address and word count of the input buffer has been programmed into both interface controllers by the microprocessor. Hence, interface controller 205 uses this memory address information to read the data stored in input buffer register 203 into a location in the input buffer of memory 207 designated by an address signal on address bus 251. Additional packets of data from the host processor are then written into the input buffer until a complete block of data is ready for transmission to the remote data center. Once a complete block of data has been loaded into the input buffer, microprocessor 208 initiates transfer of the data to USART 210 under the control of interface controller 206. USART 210 converts the parallel data back into a serial form for transmission to the remote data center via interface 211 and data set 105.

To transfer data from data set 105 to the host processor, the USART is programmed to continually monitor the receive channel of data set 105. When a complete block of received data has been written into the output buffer of the memory 207 under the control of interface controller 206, microprocessor 208 sets a bit in the status register to signal the host processor that a block of data is ready for transmission. The host processor replies by sending an output register read order to interface controller 205 which then controls the transfer of a packet of data from the memory into the output register. The data in the output register is then read out of the output register for transmission to the host processor. This operation continues until all the data words in the data block have been sent to the host processor.

In the NORMAL mode, interface unit 103 continues to transfer data between the host processor and data set 105 in response to either data received from data set 105 or orders and data received from the host processor. The interface unit will remain in the NORMAL mode until such time as the program for the microprocessor in memory 207 is mutilated due to, for example, a power failure, host processor initialization, etc. In such instances, the program to control microprocessor 208 must be reloaded into memory 207. This is accomplished by the host processor writing the PDMA and LPM bits of the status register. When both of these bits are set, interface unit 103 assumes the PREPARE TO DOWNLOAD mode.

When the interface unit is in the PREPARE TO DOWNLOAD mode, the host processor is given access to the address bus via host access buffer 801 to address interface controller 205. With such access, the host processor addresses controller registers to load the initial memory address and word count to be used to load memory 207 with a program for the microprocessor. After the initial memory address and word count are loaded into interface controller 205, the host processor writes the PDMA and LPM status register bits to cause the interface unit to assume the DOWNLOAD mode.

When the interface unit is in the DOWNLOAD mode, the program for the microprocessor is transferred from the host processor into memory 207 under the control of interface controller 205. Once the program has been loaded into the memory 207, the host processor again writes the status register to cause the interface unit to assume the NORMAL mode. With the interface unit in the NORMAL mode, the microprocessor once again controls of the interface unit to transfer information between the host processor and data set 105.

It is to be understood that the above-described direct memory access interface arrangement is merely an illustrative embodiment of the principles of this invention and that numerous other arrangements may be devised by those skilled in the art without departing from the spirit and scope of the invention.

What is claimed is:

1. A direct memory access peripheral unit controller for loading a peripheral unit program received from a host processor into a peripheral unit; said peripheral unit having a random access memory, a peripheral processor, a data bus, and an address bus; said data and address buses interconnecting said memory and said peripheral processor; said memory having a data portion addressable with a data address for storing data and a program portion addressable with a program address for storing said program; said peripheral processor being responsive to said program for transferring data between said host processor and said data portion of said memory on said data bus; said direct memory access peripheral unit controller comprising:
    buffer means for transferring information including a controller address, said program address, and said program received from said host processor onto said data bus;
    direct memory access controller means having a controller location addressable with said controller address received from said address bus to store said program address received from said host processor on said data bus for addressing said program portion with said program address on said address bus; and
    host processor access means for transferring to said address bus said controller address received from said host processor on said data bus.

2. The arrangement in accordance with claim 1 wherein said peripheral unit controller further comprises status means responsive to an order received from said host processor for inhibiting said peripheral processor from using said data and address buses.

3. The peripheral unit controller in accordance with claim 1 wherein said peripheral unit controller further comprises address latch means for transferring a portion of said program address received from said direct memory access controller means on said data bus to said address bus.

4. The peripheral unit controller in accordance with claim 1 wherein said buffer means comprises first buffer means for transferring said information including said data received from said host processor to said data bus and second buffer means for transferring said data from said data bus to said host processor.

5. A peripheral unit controller for transferring data between a host processor and a peripheral unit having a peripheral unit processor and a memory having a data portion and a program portion, said peripheral unit controller comprising buffer means for transferring information including said data and a program between said host processor and said memory, and memory controller means responsive to a data address from said peripheral unit processor to transfer said data between said buffer means and said data portion and responsive to a controller address from said host processor to transfer said program from said buffer means to said program portion.

6. The direct memory access peripheral unit controller in accordance with claim 5 wherein said peripheral unit has an address bus and a data bus interconnecting said peripheral unit processor and said memory and wherein said buffer means is connected to said data bus and said memory controller means is connected to said address and said data bus, said memory controller means further comprising host access means responsive to orders received from said host processor to transfer said controller address from said data bus to said address bus.

7. The direct memory access peripheral unit controller in accordance with claim 6 wherein said peripheral unit controller further comprises status register means responsive to said orders from said host processor for selectively controlling said memory controller and said host access means.

8. The direct memory access peripheral unit controller in accordance with claim 6 wherein said peripheral unit controller further comprises means responsive to said orders from said host processor for generating peripheral unit processor inhibit signals.

9. A direct memory access peripheral unit controller for loading a peripheral unit program received from a host processor into a peripheral unit; said peripheral unit having a random access memory, a peripheral unit processor, a data bus, and an address bus; said data and address buses interconnecting said memory and said peripheral unit processor; said memory having a data portion addressable with a data address for storing data and a program portion addressable with a program address for storing said program; said peripheral unit processor being responsive to said program for transferring data between said host processor and said data portion of said memory on said data bus; said peripheral unit controller comprising:
    buffer means for transferring information including a controller address, said program address, and said program received from said host processor onto said data bus; and
    interface controller means having a controller location addressable with said controller address on said address bus and responsive to said controller address and said program address received from said host processor on said data bus for addressing said program portion of said memory to load said program received from said host processor on said data bus into said program portion of said memory.

10. The peripheral unit controller of claim 9 wherein said interface controller means comprises direct memory access controller means having said addressable controller location and responsive to said controller address on said address bus and said program address on said data bus for addressing said program portion of said memory to load said program received from said host processor on said data bus into said program portion of said memory; and access means for transferring said controller address received from said host processor on said data bus to said address bus.

11. The peripheral unit controller of claim 10 in which said peripheral unit controller is responsive to a plurality of orders received from said host processor for assuming a plurality of states and wherein said peripheral unit controller further comprises status means responsive to said orders for controlling the state of said peripheral unit controller.

12. The peripheral unit controller of claim 11 in which said peripheral unit controller is responsive to a first of and said orders for assuming a first of said states, said peripheral unit controller in said first state transferring said controller address received from said host processor on said data bus to said address bus.

13. The peripheral unit controller of claim 12 in which said peripheral unit controller is responsive to a second of said orders for assuming a second of said states, said peripheral unit controller in said second state loading said peripheral unit program received from said host processor into said program portion of said memory.

14. The peripheral unit controller of claim 9 in which said peripheral unit controller is responsive to a plurality of orders received from said host processor for assuming a plurality of states and wherein said peripheral unit controller further comprises status means responsive to said orders for controlling the state of said peripheral unit controller.

15. The peripheral unit controller of claim 9 in which said peripheral unit controller is responsive to a first of said orders for assuming a first of said states, said peripheral unit controller in said first state transferring said controller address received from said host processor on said data bus to said address bus.

16. The peripheral unit controller of claim 9 in which said peripheral unit controller is responsive to a second of said orders for assuming a second of said states, said peripheral unit controller in said second state loading said peripheral unit program received from said host processor into said program portion of said memory.

17. The peripheral unit controller of claim 9 in which said peripheral unit controller is responsive to a third of said orders for assuming a third of said states, said peripheral unit controller in said third state transferring data between said host processor and said peripheral unit.

18. The peripheral unit controller of claim 9 in which said peripheral unit controller is responsive to a fourth of said orders received from said host processor for inhibiting said peripheral unit processor from using said data and address buses.

19. The peripheral unit controller of claim 9 wherein said peripheral unit controller further comprises decoder means for decoding said orders received from said host processor.

20. The peripheral unit controller of claim 9 wherein said buffer means comprises input means for transferring said information including said data received from said host processor to said data bus and output means for transferring said data from said data bus to said host processor.

* * * * *

UNITED STATES PATENT AND TRADEMARK OFFICE
CERTIFICATE OF CORRECTION

PATENT NO. : 4,538,224

DATED : August 27, 1985

INVENTOR(S) : Thomas A. Peterson

It is certified that error appears in the above-identified patent and that said Letters Patent is hereby corrected as shown below:

Column 11, line 34, claim 1, after "unit" insert --controller--;
Column 13, line 23, claim 12, "of and said" should be "of said".

Signed and Sealed this

Eleventh Day of June, 1991

Attest:

HARRY F. MANBECK, JR.

Attesting Officer

Commissioner of Patents and Trademarks